(12) United States Patent  (10) Patent No.: US 9,323,496 B2
Nosaka  (45) Date of Patent: Apr. 26, 2016

(54) ELECTRONIC DEVICE CAPABLE OF TRANSMITTING AN IMAGE

(71) Applicant: Panasonic Corporation, Osaka (JP)

(72) Inventor: Masafumi Nosaka, Osaka (JP)

(73) Assignee: Panasonic Intellctual Property Management Co., Ltd., Osaka (JP)

(*) Notice: Subject to any disclaimer, the term of this patent is extended or adjusted under 35 U.S.C. 154(b) by 265 days.

(21) Appl. No.: 14/013,259

(22) Filed: Aug. 29, 2013

(65) Prior Publication Data

US 2014/0062835 A1    Mar. 6, 2014

(30) Foreign Application Priority Data

Sep. 3, 2012 (JP) ................ 2012-193020
Aug. 2, 2013 (JP) ................ 2013-160882

(51) Int. Cl.
*G09G 5/00* (2006.01)
*G06F 3/14* (2006.01)

(52) U.S. Cl.
CPC ........... *G06F 3/1423* (2013.01); *G06F 3/1454* (2013.01); *G09G 2320/103* (2013.01)

(58) Field of Classification Search
None
See application file for complete search history.

(56) References Cited

U.S. PATENT DOCUMENTS

| | | | |
|---|---|---|---|
| 2002/0191081 A1 | 12/2002 | Ueyama | |
| 2004/0119840 A1 | 6/2004 | Ishihara et al. | |
| 2006/0070111 A1 | 3/2006 | Kurosawa | |
| 2006/0181613 A1 | 8/2006 | Cazier | |
| 2010/0040297 A1* | 2/2010 | Ohba et al. | 382/232 |
| 2011/0199383 A1* | 8/2011 | Anderson et al. | 345/581 |
| 2012/0127196 A1* | 5/2012 | Landry | 345/619 |
| 2012/0130845 A1* | 5/2012 | Telek et al. | 705/26.5 |
| 2013/0060926 A1* | 3/2013 | Kato et al. | 709/223 |

FOREIGN PATENT DOCUMENTS

| | | |
|---|---|---|
| JP | 2002-354329 | 12/2002 |
| JP | 2004-7273 | 1/2004 |
| JP | 2006-101009 | 4/2006 |
| JP | 2006-222973 | 8/2006 |
| JP | 2010-98599 | 4/2010 |

* cited by examiner

*Primary Examiner* — Joseph Feild
*Assistant Examiner* — Henok Heyi
(74) *Attorney, Agent, or Firm* — Panasonic Patent Center

(57) ABSTRACT

An electronic device includes an image capturing unit configured to generate captured data, a display unit, a communication unit configured to transmit image data based on the generated captured data to an external device, and a controller. When transmitting first image data resulting in a first delay on transmitting the first image data to the external device, the controller causes an image which corresponds to the first image data and is based on the captured data to be displayed on the display unit. When transmitting second image data resulting in a second delay larger than the first delay on transmitting the second image data to the external device, the controller causes an image other than an image corresponding to the second image data to be displayed on the display unit.

8 Claims, 12 Drawing Sheets

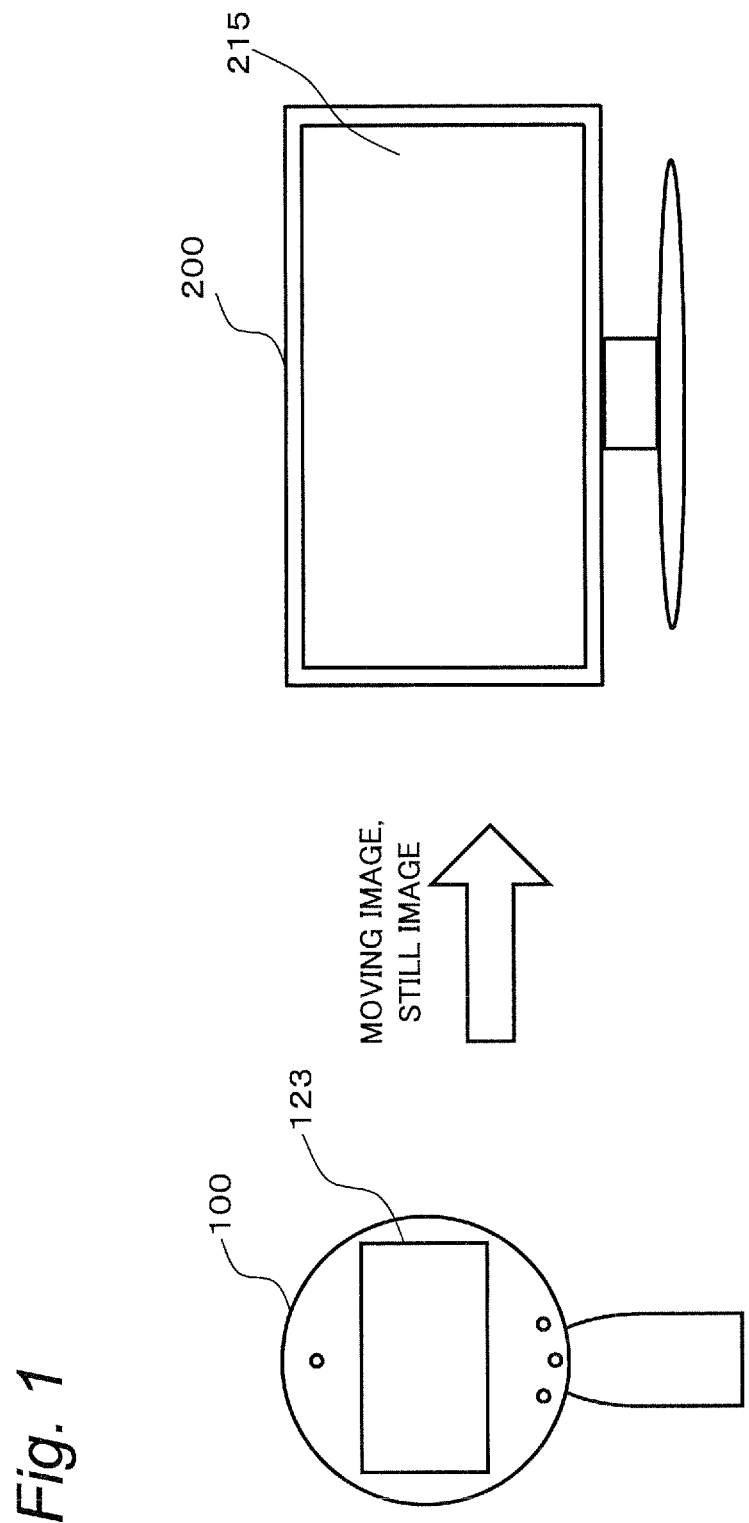

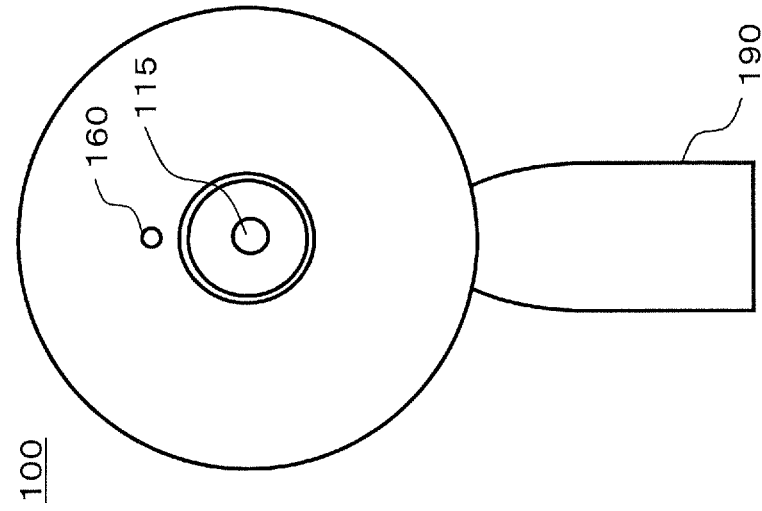
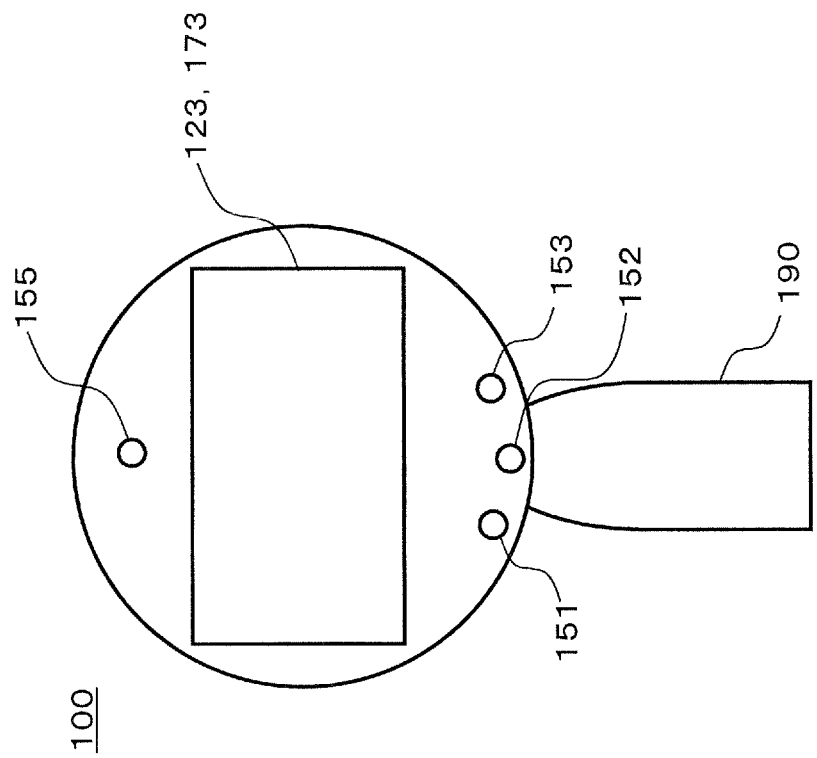

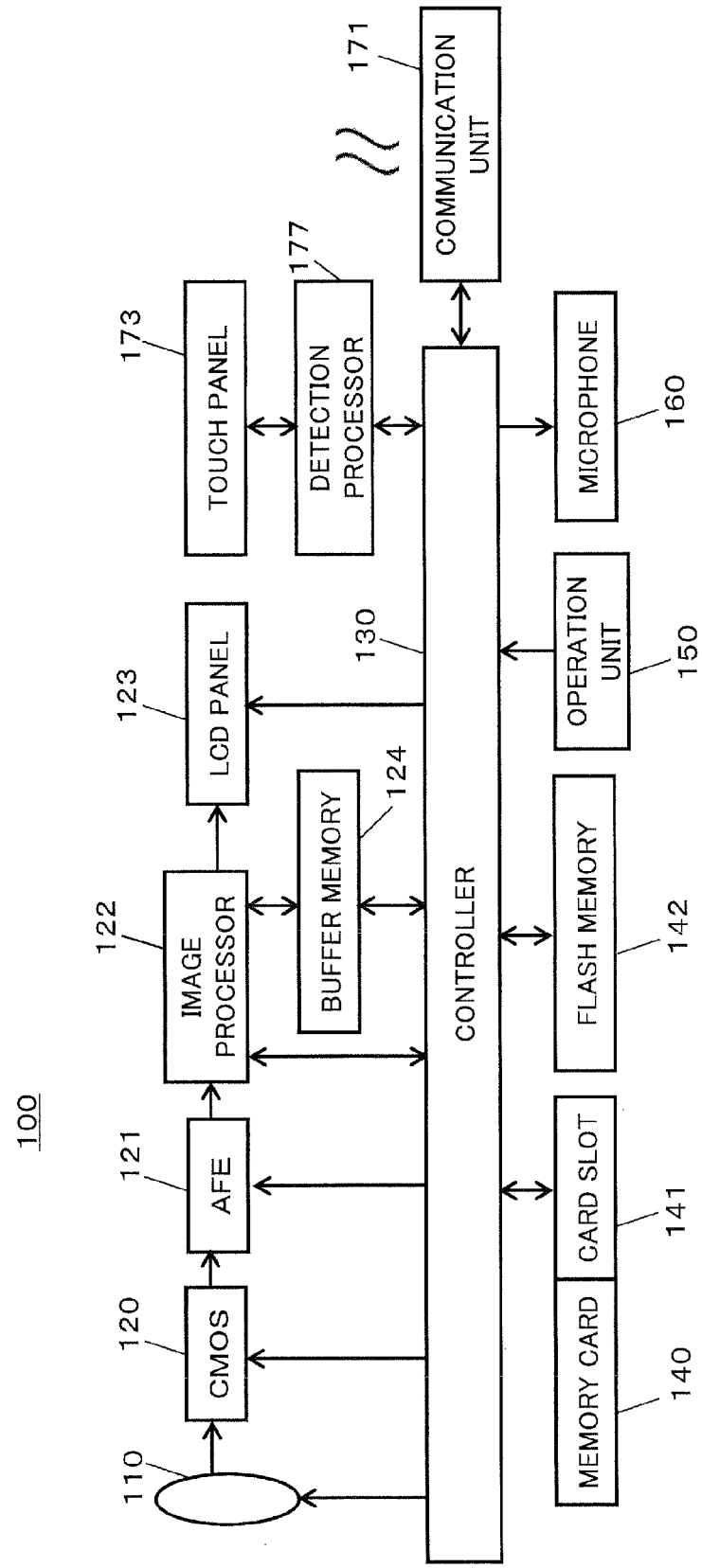

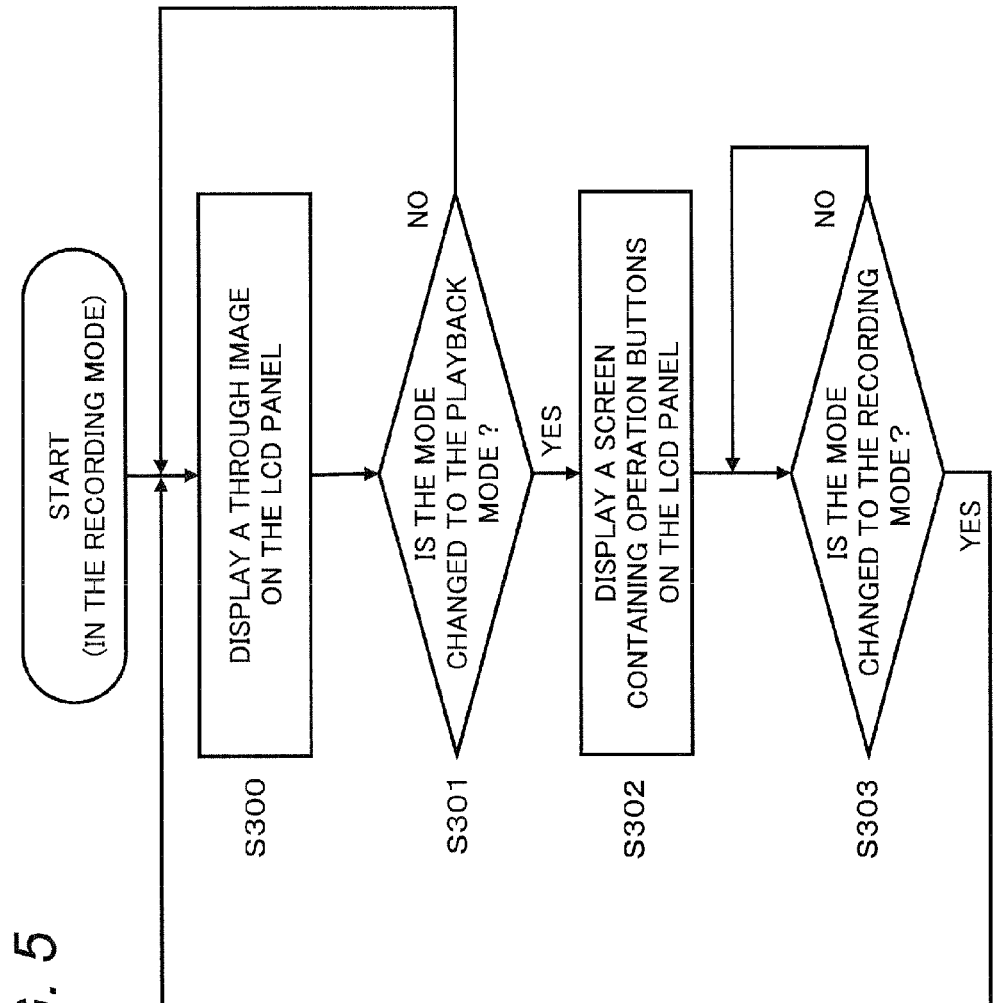

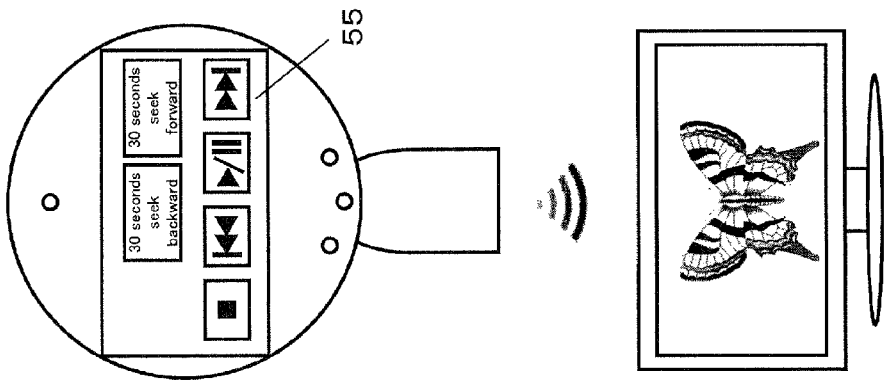
FIG. 6B  IN THE PLAYBACK MODE
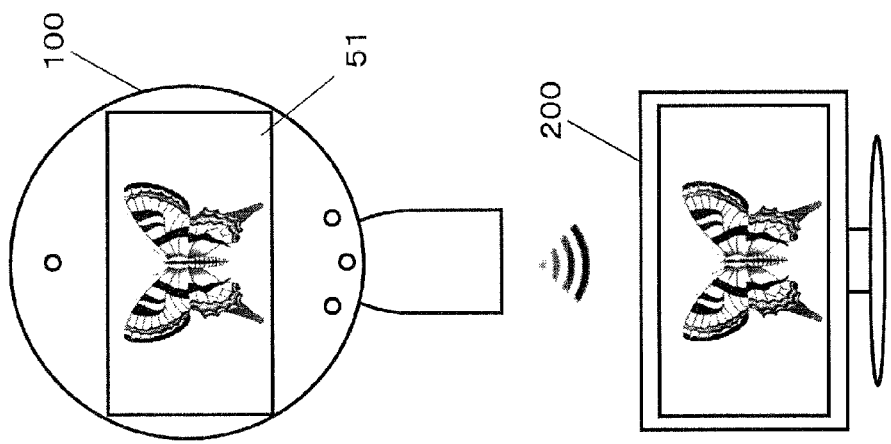
FIG. 6A  IN THE RECORDING MODE

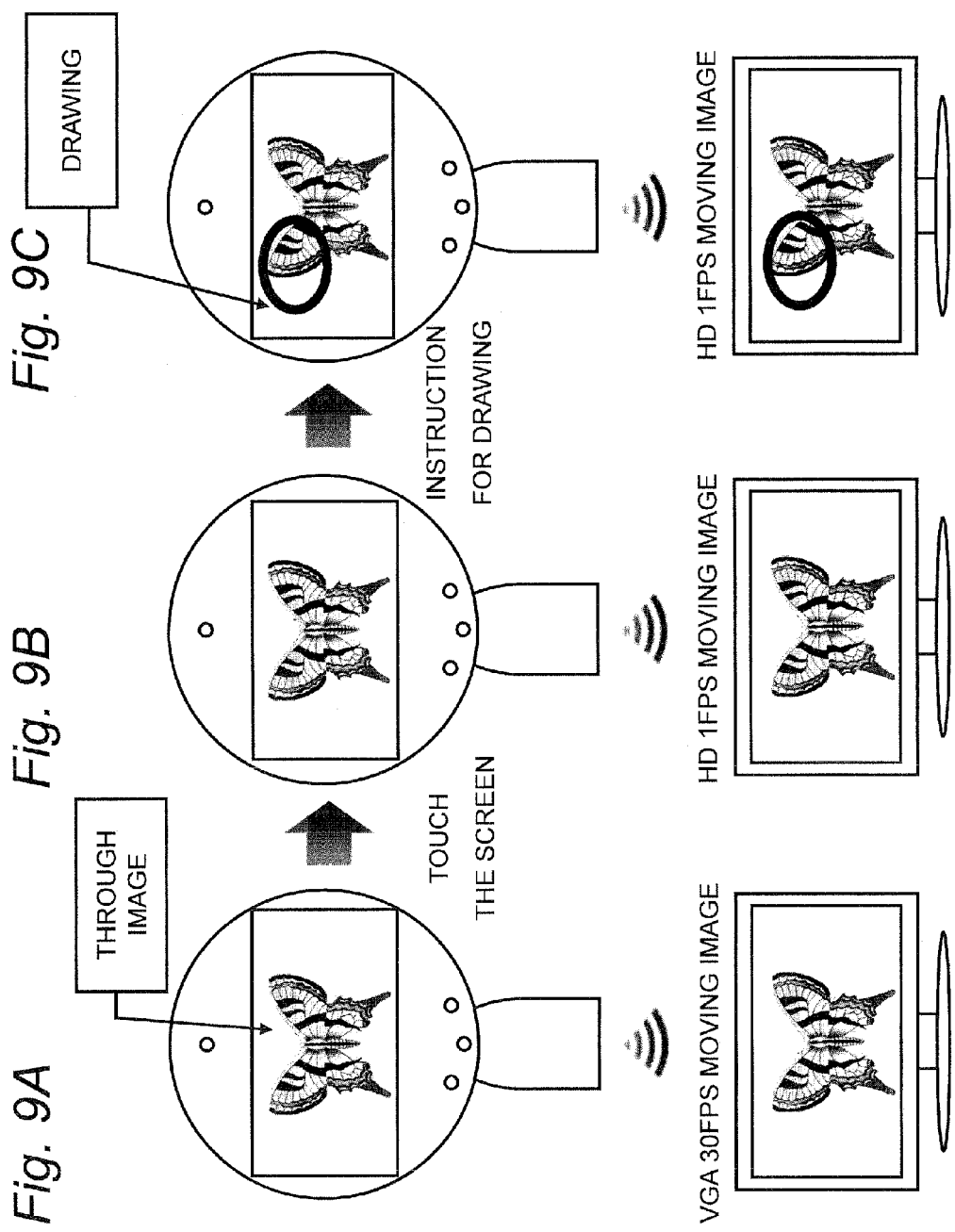

ELECTRONIC DEVICE CAPABLE OF TRANSMITTING AN IMAGE

BACKGROUND

1. Technical Field

The present disclosure relates to an electronic device capable of transmitting an image.

2. Related Art

Electronic devices having a communication function are common today. Having a communication function enables the electronic device to transmit image data and other types of data to other electronic devices. For example, such devices described in Japanese Unexamined Patent Application Publication JP-A-2002-354329 are known.

One type of device to which image data is transmitted is a display device. The display device displays the received image data on its own display. As the size of the display increases, the possible number of people who can view the received image at the same time also increases. It is desirable to make the display easier to view and share by viewers.

SUMMARY

The disclosure provides an electronic device capable of preferably displaying when transmitting images to an external device.

A first electronic device according to the disclosure is an electronic device capable of transmitting image data to an external device. The electronic device includes: an image capturing unit configured to generate captured data; a display unit; a communication unit configured to transmit image data based on the generated captured data to the external device; and a controller configured to control the display unit. When transmitting first image data resulting in a first delay on transmitting the first image data to the external device, the controller causes an image which corresponds to the first image data and is based on the captured data to be displayed on the display unit. When transmitting second image data resulting in a second delay larger than the first delay on transmitting the second image data to the external device, the controller causes an image other than an image corresponding to the second image data to be displayed on the display unit.

A second electronic device according to the disclosure is an electronic device capable of transmitting image data to an external device. The electronic device includes: an image capturing unit configured to generate captured data; a display unit; a communication unit configured to transmit image data based on the generated captured data to the external device; and a controller configured to control the display unit. The controller has a recording mode for recording image data based on the captured data generated by the image capturing unit, and a playback for reproducing image data recorded in a predetermined recording medium. In the recording mode, the controller transmits an image based on the captured data which is generated by the image capturing unit to the external device through the communication unit, and causes the image based on the captured data generated by the image capturing unit to be displayed on the display unit. In the playback mode, the controller transmits the image data recorded in the predetermined recording medium to the external device through the communication unit, and causes no image based on the image data recorded in the predetermined recording medium to be displayed on the display unit.

The disclosure provides an electronic device capable of preferably displaying when transmitting images to an external device.

BRIEF DESCRIPTION OF THE DRAWINGS

FIG. 1 shows the configuration of a system including a digital video camera and a display device.

FIG. 2A is a front view of the digital video camera.

FIG. 2B is a back view of the digital video camera.

FIG. 3 is a block diagram showing the configuration of the digital video camera.

FIG. 5 is a flow chart of a display operation in the digital video camera that changes the display according to the quality of the transferred moving image.

FIGS. 6A and 6B describe button icons displayed on the digital video camera.

FIG. 9A to 9C describe a changing operation of the display screen when recording a still image is commanded during transferring moving image.

DESCRIPTION OF PREFERRED EMBODIMENTS

Figure 4:
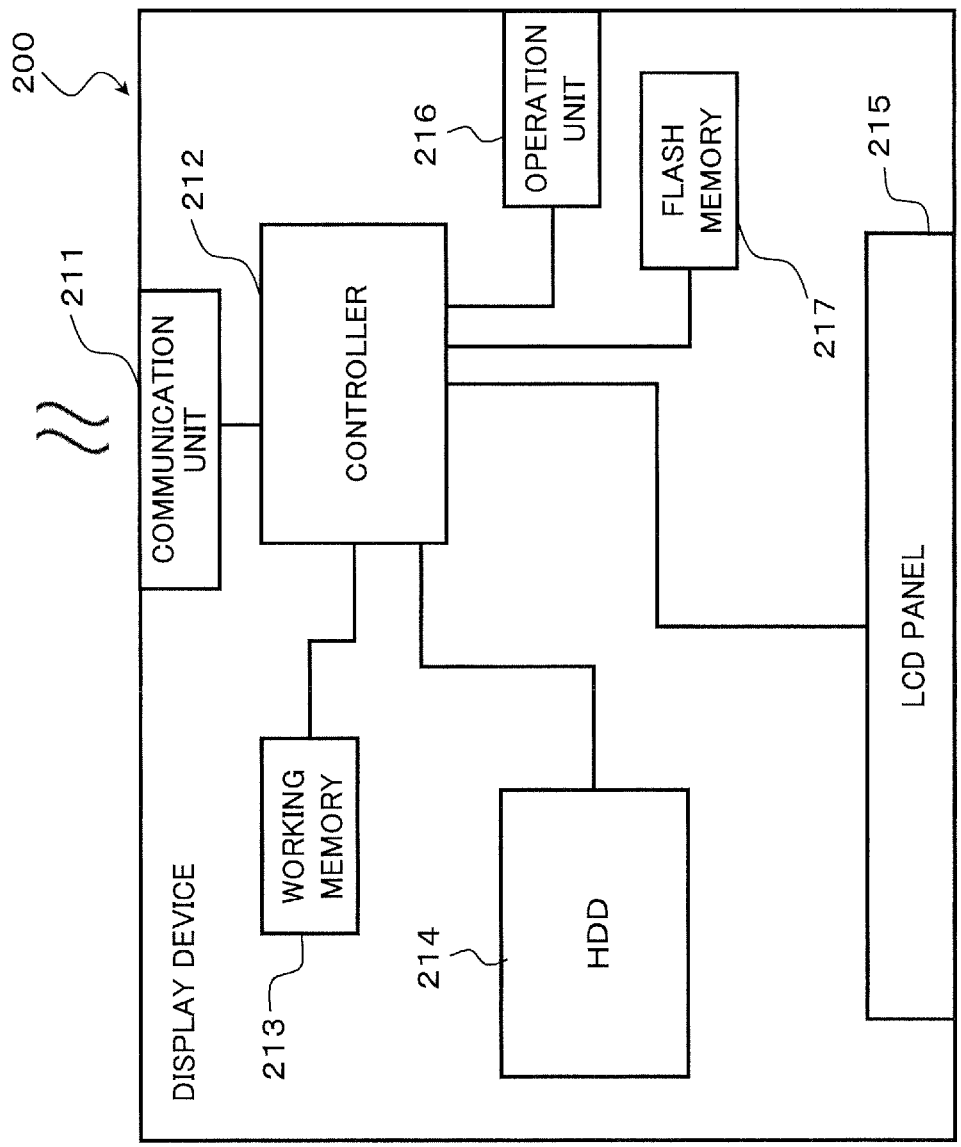
FIG. 4 is a block diagram showing the configuration of a display device.

An embodiment is described below with reference to the accompanying figures. Note that excessively detailed description may be omitted. For example, detailed description of content that is already well-known, and redundant description of substantially identical elements, may be omitted. This is to avoid unnecessary redundancy in the following description, and to simplify understanding by those skilled in the related art. The accompanying figures and following description are provided by the inventor(s) to facilitate understanding by those skilled in the related art, and are not intended to limit the subject described in the scope of the accompanying claims.

In general, in a system that displays images transmitted from a digital video camera on an external display device, it is desired that the digital video camera transmits high-definition (HD) quality images having higher image quality to the external display device in real time. However, when the image processing capability of the digital video camera is low, processing HD quality image is time-consuming. In order to transmit HD quality image to a display device, for example, the digital video camera spend time to negotiate with the display device to enable communication, and to buffer at least the least amount of data required to smoothly playback the image on the display device. Furthermore, because HD quality image has a higher bit rate than VGA quality image, a relatively longer transferring time is required to transmit HD quality image when transmitting over a path of a given bandwidth. As a result, there is a significant time delay (a shift in the display timing) between the through image (through-thelens image) displayed on the digital video camera and the received image displayed on the display device when transferring HD quality image from the camera to the display device.

The inventor became aware of this delay problem through trial and error, and recognized the problem of displaying images in a more user-friendly way. The configuration and operation of a digital video camera 1 and a display device according to embodiments that solve this problem are described below.

In the following embodiment VGA image quality is described below as an example of an image quality that is relatively low but also subject to little delay from transmission, and high-definition (HD) image quality is described as an example of an image quality that is relatively high but also subject to a long delay, however, the technical concept of the disclosure is not limited to these. More specifically, the technology of the disclosure can be applied to any electronic device capable of processing a first image quality that is relatively low and can be transmitted with little delay, and a second image quality that is relatively high and has a long delay.

Embodiment 1

1. Configuration

FIG. 1 describes a display system including a digital video camera 100 and a display device 200 according to a first embodiment. The digital video camera 100 can capture and transmit the moving and still images to the display device 200 (live streaming). The display device 200 can display the moving and still images received from the digital video camera 100 on an LCD panel 215.

The image quality of the moving and still images transmitted by the digital video camera 100 can be set to VGA (Video Graphics Array) quality or HD (High Definition) quality. HD quality moving and still images have higher image quality than VGA quality moving and still images.

The display system including the digital video camera 100 and the display device 200 according to the first embodiment anticipates use in an educational setting, for example. For example, a school teacher captures a subject (teaching material) with the digital video camera 100, and transmits (live streaming) the captured images (moving or still image) to the display device 200. The display device 200 then displays the images received from the digital video camera 100. The images can therefore be shared between the teacher and multiple students. More specifically, the teacher can talk about while viewing the through image displayed on the LCD panel 123 of the digital video camera 100, and the multiple students can listen to the teacher's explanation while viewing the same images displayed on the display device 200. If there is a delay (a shift in the display timing) between the through image displayed on the LCD panel 123 of the digital video camera 100 and the image displayed on the display device 200, a disconnect can result between what the teacher is describing and the displayed image on the display device 200 viewed by the students. The lesson therefore does not proceed smoothly, and confusion can result. The display system according to this embodiment described below solves this problem so that such confusion is avoided.

The configuration of each of the digital video camera 100 and the display device 200 is described below with reference to the figures.

1-1 Configuration of the Digital Video Camera

FIG. 2A and FIG. 2B are external views of a digital video camera 100 in a display system according to this embodiment. FIG. 2A is a front-view of the digital video camera 100, and FIG. 2B is a rear-view of the digital video camera 100. As shown in FIG. 2A, the digital video camera 100 includes an LCD panel 123, a touch panel 173, various buttons 151 to 153, and a power switch 155 on the front of the digital video camera 100. The digital video camera 100 includes an aperture 115 provided for capturing images, and a microphone 160 configured to pick up audio on the back. An optical system is housed inside the aperture 115. The digital video camera 100 also has a grip 190 for being held by the user.

FIG. 3 is a block diagram describing the configuration of the digital video camera 100. The digital video camera 100 captures subject images formed through the optical system 110 with a CMOS image sensor 120. The CMOS image sensor 120 generates image data based on the imaged subject. The image data generated by the capturing is processed by an analog front end (AFE) 121 and an image processor 122. The image data is stored in a flash memory 142 or a memory card 140. The image data stored in the flash memory 142 or memory card 140 is displayed on the LCD panel 123 in response to user operation of the operation unit 150. The image data captured by the CMOS image sensor 120 and processed by the image processor 122 is displayed on the LCD panel 123 as a through image.

The optical system 110 includes lenses such as a focusing lens, zoom lens, and optical image stabilizer (OIS) for eliminating hand shake blur. The optical system 110 may include any desirable number of lens elements or lens groups.

The CMOS image sensor 120 captures the subject image formed through the optical system 110 and generates captured data. The CMOS image sensor 120 generates captured data for new frames at a predetermined frame rate (such as 30 frames/second). The captured data generation timing and the electronic shutter operation of the CMOS image sensor 120 are controlled by the controller 130. A CCD image sensor or an NMOS image sensor, or other type of imaging element may be used instead of the CMOS image sensor.

The AFE 121 applies a process such as correlated double sampling to the captured data generated by the CMOS image sensor 120. The AFE 121 also converts analog captured data to digital captured data. The AFE 121 then outputs the image data to the image processor 122.

The image processor 122 applies various processes to the captured data. The various processes may include gamma correction, white balance correction, YC conversion, digital zooming, compression, and expansion processes, but not limited thereto. The image processor 122 generates image data from the captured data by applying various processes.

Based on a set image quality parameter, the image processor 122 generates image data from the captured data. When the set image quality parameter indicates VGA quality, the image processor 122 generates VGA quality image data from the captured data based on the image quality parameter. When the set image quality parameter indicates HD quality, the image processor 122 generates HD quality image data from the captured data based on the image quality parameter. The image processor 122 may be configured with a hard-wired electronic circuit, or a microcomputer that runs a program to execute these processes. The image processor 122 may also be configured as one integrated circuit together with the controller 130.

The LCD panel 123 displays an image based on the image data (moving or still image data) processed by the image processor 122. The images displayed by the LCD panel 123 include through images and recorded images. The LCD panel 123 displays data as through images in real-time, which is obtained by processing as VGA quality moving image by the image processor 122 on the captured data successively generated by the CMOS image sensor 120. The user can shoot a subject confirming the composition of the subject by viewing the through image displayed on the LCD panel 123.

Recorded images are the images contained in the image data (moving or still image data) stored to the memory card 140 or the flash memory 142. In addition to the images represented by the image data, the LCD panel 123 can also display a screen for changing digital video camera 100 setting values, and an operation screen configured to manipulate the display content of the display device 200 when communicating with the display device 200 through the communication unit 171. An Organic LED (OLED) display or other type of display device can also be used instead of an LCD panel.

The touch panel 173 is disposed on the surface of the LCD panel 123, and outputs information related to the electrode positions touched by the user on the touch panel 173.

Based on the electrode position information output by the touch panel 173, the detection processor 177 calculates the coordinates of the location touched by the user on the touch panel and outputs the calculated coordinates to the controller 130. As a result, the controller 130 can determine the position to which the user performs a touch operation on the touch panel 173.

The controller 130 centrally controls overall operation of the digital video camera 100. The controller 130 sends control signals to the CMOS image sensor 120 and the image processor 122 and so on based on the vertical synchronization signal (VD). The controller 130 is configured to include a ROM configured to store information such as programs, and a CPU configured to execute the programs, for example. In addition to programs related to auto focus control and automatic exposure control, ROM also stores a program configured to control overall operation of the digital video camera 100.

The controller 130 recognizes where the user touched inside the picture frame displayed on the LCD panel 123 from the position coordinates output by the detection processor 177, recognizes the user operation based on the touch position, and executes a process corresponding to the operation. For example, when the LCD panel 123 displays a screen for changing setting values of the digital video camera 100 or an operation screen configured to manipulate the display content of the display device 200 communicating with the digital video camera 100 through the communication unit 171, the controller 130 processes executing the setting or operation corresponding to the touched position. Alternatively, when the LCD panel 123 displays a through image, the controller 130 adjusts the focus to the image area corresponding to the touched position, and then processes an execution of a recording instruction of a still image.

The controller 130 may be configured with a hard-wired electronic circuit or a microcomputer, etc. The controller 130 may also be configured as one integrated circuit together with the image processor 122.

The buffer memory 124 is storage means for functioning as a working memory for the image processor 122 and the controller 130. The buffer memory 124 may be embodied by DRAM (Dynamic Random Access Memory), for example.

The flash memory 142 functions as an internal memory configured store image data, for example. The controller 130 stores image data processed by the image processor 122 in the flash memory 142 or the memory card 140.

The card slot 141 is connection means capable of being inserted the memory card 140. The card slot 141 is electrically and mechanically connectable with the memory card 140.

The memory card 140 is an external memory containing a storage unit such as a flash memory. The memory card 140 can store image data and other data processed by the image processor 122. This embodiment describes a memory card 140 as an example of external memory, but an optical disc, hard disk drive (HDD), or other storage medium could be used as an external memory.

The communication unit 171 is a wireless or wired communication interface and the controller 130 controls the communication unit 171 to communicate with the display device 200 or other electronic device having a communication function. The communication unit 171 communicates according to USB, Bluetooth (trademark), a wireless LAN, wired LAN, or other communication protocol.

The operation unit 150 is a general name for operation buttons and operating levers provided on the outer surface of the digital video camera 100, and receives operations performed by the user. When the operation unit 150 detects an operation by the user, the operation unit 150 sends various operation command signals to the controller 130. The operation unit 150 includes buttons 151 to 153, for example.

1-2. Configuration of the Display Device

The configuration of the display device 200 is described below with reference to FIG. 4. FIG. 4 is a block diagram showing the configuration of the display device 200.

The display device 200 is configured to include a communication unit 211, a controller 212, a working memory 213, a hard disk drive (HDD) 214, an LCD panel 215, an operation unit 216, and a flash memory 217, and so on.

The controller 212 controls overall operation of the display device 200. The controller 212 is electrically connected to the communication unit 211, the working memory 213, the hard disk drive 214, the LCD panel 215, the flash memory 217, and the operation unit 216. The controller 212 receives operation information performed by the user using the operation unit 216. The controller 212 reads information stored in the hard disk drive 214 and the flash memory 217.

The working memory 213 is a memory for temporarily storing information required by the controller 212 to execute various processing operations.

The hard disk drive 214 is a high capacity data disk drive configured to store various data. As described above, the controller 212 can appropriately read various data (such as image data) stored in the hard disk drive 214.

The communication unit 211 is a wireless or wired communication interface, and the controller 212 can communicate with the digital video camera 100 through the communication unit 211. The communication unit 211 communicates according to USB, Bluetooth (trademark), a wireless LAN, wired LAN, or other communication protocol.

The LCD panel 215 displays images based on the moving or still image data received from the digital video camera 100. By viewing the images displayed on the LCD panel 215, the user can know the content of the images based on the moving or still image data transmitted from the digital video camera 100. An OLED display or other type of display device can also be used instead of an LCD panel.

This embodiment describes transferring images from the digital video camera 100 to the display device 200 as an example, but not limited thereto. For example, images may be transmitted to a projector or other device that projects images received from the digital video camera 100. Further, images may be transferred to other devices such as storage devices or other device that stores images transferred from the digital video camera 100.

The digital video camera 100, a display device, a projector, a storage device, and an information processing device may communicate through a direct connection, or may communicate through an intermediate relay device. When communicating through a relay device, the relay device may also process the transferred image according to the specifications required by the device to which the digital video camera 100 is transferring images. The relay device may be a personal computer or other information processing device, for example. More specifically, the digital video camera 100 may open a communication link with a personal computer or other information processing device, and may transmit image data through the information processing device to the display device or other destination device.

The display device 200 is an example of an external display device. A personal computer is an example of an information processing device. The digital video camera 100 is an example of an electronic device. The CMOS image sensor 120 is an example of an image capturing unit. The memory card 140 is an example of a recording medium. The card slot 141 and the controller 130 are examples of a recording unit. The LCD panel 123 is an example of a display unit. The operation unit 150 and the touch panel 173 are examples of an operation unit. The controller 130 is an example of a controller. A VGA quality image is an example of a first image that may result a first delay due to communication with an external device. An HD quality image is an example of a second image that may result a second delay that is greater than the first delay due to communication with an external device.

2. Operation

The operation of the digital video camera 100 and the display device 200 are described below.

The digital video camera 100 and the display device 200 each have a communication function. Establishment of a communication connection between the digital video camera 100 and the display device 200 is handled according to a procedure based on a communication protocol (such as the wireless LAN Wi-Fi (trademark)) which is supported by the communication unit 171 and the communication unit 211. When communication is established between the digital video camera 100 and the display device 200, the digital video camera 100 can transfer moving and still image data to the display device 200.

The digital video camera 100 has a recording mode and a playback mode. In the recording mode, the digital video camera 100 images a subject, and displays a through image based on the captured data on the LCD panel 123. In addition, in the recording mode the controller 130 of the digital video camera 100 receives touch operations on the touch panel 173, and video recording instruction and still image recording instruction from the user operating a button 151, for example. On the other hand, in the playback mode, the digital video camera 100 reads image data recorded on the memory card 140, and displays the images on the LCD panel 123.

In the recording mode, when a communication connection is established with the display device 200 and when transferring images to the display device 200 is enabled, the image processor 122 sets the image quality parameter to VGA quality, and generates VGA quality moving image data. In this mode, the image processor 122 generates a through image to be displayed on the LCD panel 123 and VGA quality moving image data, from the capturing image data. The controller 130 causes the generated through image to be displayed on the LCD panel 123. Simultaneously, the controller 130 also controls the communication unit 171 to transfer the generated VGA quality moving image data to the display device 200.

In addition, in the recording mode, when a command to transfer higher resolution images to the display device 200 is asserted, the image processor 122 sets the image quality parameter to HD quality, and generates HD quality moving image data for transmission to the display device 200. A command to transfer higher resolution images to the display device 200 is asserted by the user when someone viewing the display device 200 wants to observe the image in more detail, for example. This command is asserted by operating the operation unit 150 or by operating the touch panel 173. The controller 130 controls the communication unit 171 to transfer the generated HD quality moving image data to the display device 200.

On the other hand, in the playback mode, the image processor 122 reads moving image data recorded on the memory card 140, and the controller 130 transfers the read moving image data to the display device 200.

2.1 Displaying Images According to the Mode

The image displayed on the LCD panel 123 of the digital video camera 100 is changed according to the degree of delay in transfer of the image sent to the display device 200. More specifically, the image displayed on the LCD panel 123 of the digital video camera 100 changes according to the degree of delay resulting from the data transfer when transferring images from the digital video camera 100 to the display device 200. Here, the delay means the timing shift (namely, shift in the display timing) between the image displayed on the LCD panel 123 of the digital video camera 100 and the image displayed on the display device 200.

Figure 7:
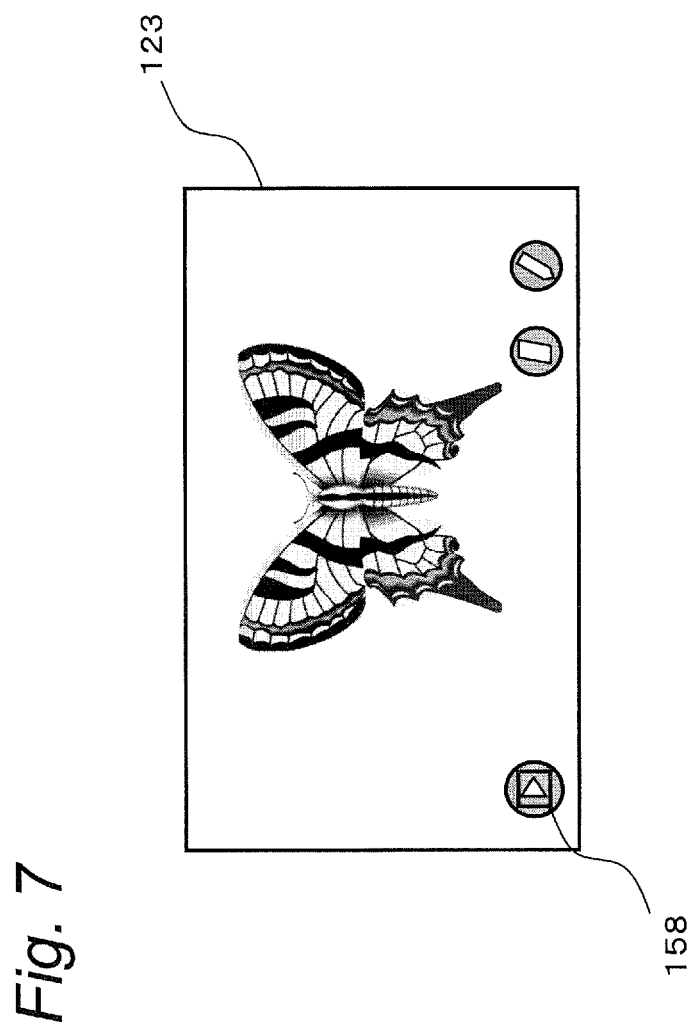
FIG. 7 describes a display screen changed and displayed according to the image quality of the transferred moving image in the digital video camera.

The steps in this operation are described below with reference to FIG. 5 to FIG. 7. FIG. 5 is a flow chart showing the display operation of the digital video camera 100 when the image displayed on the LCD panel 123 is changed according to the image quality of the transferred video.

The display operation is described based on the digital video camera 100 as being set initially to the recording mode. When the digital video camera 100 is in the recording mode, the controller 130 of the digital video camera 100 causes a through image 51 to be displayed on the LCD panel 123 as shown in FIG. 6A (S300). Next, the controller 130 of the digital video camera 100 detects whether or not the operating mode was changed from the recording mode to the playback mode (S301). Unless the operation mode is changed to the playback mode (S301 returns NO), the controller 130 of the digital video camera 100 causes the through image 51 to be continuously displayed on the LCD panel 123. The user changes the mode from the recording mode to the playback mode by touching a button icon 158 superimposed on the through image on the LCD panel 123 as shown in FIG. 7.

If the playback mode is selected (S301 returns YES), the controller 130 of the digital video camera 100 causes an operation screen 55 containing operation buttons for operating the display device 200 to be displayed on the LCD panel 123 as shown in FIG. 6B, for example (S302). The controller 130 of the digital video camera 100 then detects whether or not the mode is changed from the playback mode to the recording mode (S303). Unless the recording mode is selected (S303 returns NO), the controller 130 of the digital video camera 100 causes the operation screen 55 to be continuously displayed on the LCD panel 123. If the operation mode is changed to the recording mode (S303 returns YES), the controller 130 of the digital video camera 100 causes the through image 51 to be redisplayed on the LCD panel 123

(S300). The digital video camera 100 thereafter repeats the operation of step S300 to step S303.

As described above, this embodiment of the disclosure displays a through image 51 on the LCD panel 123 of the digital video camera 100 as shown in FIG. 6A when in the recording mode (S300), and displays an operation screen 55 on the LCD panel 123 of the digital video camera 100 as shown in FIG. 6B when in the playback mode (S302). The reason for changing the content displayed on the LCD panel 123 in this way is described below.

FIG. 6A shows an example of the screen content displayed on the LCD panel 123 of the digital video camera 100 and the LCD panel 215 of the display device 200 in the recording mode. FIG. 6B shows an example of the screen content displayed on the LCD panel 123 of the digital video camera 100 and the LCD panel 215 of the display device 200 in the playback mode.

In this embodiment, in the recording mode, a VGA quality through image is transferred from the digital video camera 100 to the display device 200. As a result, in the recording mode, the difference (the difference due to transferring delay) between the display timing of the through image displayed on the LCD panel 123 of the digital video camera 100 and the display timing of the image displayed on the LCD panel 215 of the display device 200 is relatively small. The through image 51 is therefore displayed on the LCD panel 123 of the digital video camera 100 as shown in FIG. 6A. The user can therefore view the moving image while being transferred from the digital video camera 100 to the display device 200 on both the LCD panel 123 of the digital video camera 100 and the LCD panel 215 of the display device 200.

However, the moving image is recorded in HD quality on the memory card 140, and in the playback mode, HD quality moving image is transferred from the digital video camera 100 to the display device 200. As a result, the difference (the difference due to transferring delay) between the display timing of the playback image displayed on the LCD panel 123 of the digital video camera 100 when a playback image is displayed, and the display timing of the playback image displayed on the LCD panel 215 of the display device 200 may be relatively long in the playback mode. Therefore, if the playback image is displayed on the LCD panel 123 of the digital video camera 100 in this mode, the user of the digital video camera 100 and viewers watching the display device 200 will not see the same moving image at the same time.

The user of the digital video camera 100 and viewers watching the display device 200 may therefore focus on different image content at the same time, resulting in confusion and disagreement. This problem is particularly acute when the user of the digital video camera 100 and viewers watching the display device 200 are in the same room (such as a classroom). In view of this problem, in the playback mode, an operation screen 55 is displayed on the LCD panel 123 of the digital video camera 100 as shown in FIG. 6B, and the captured image is displayed only on the display device 200. Both the user of the digital video camera 100 and the viewers will therefore look at the same image displayed on the display device 200, and the user and the viewers will see the same image while talking.

The LCD panel 123 of the digital video camera 100 may be configured to display no image for the purpose of displaying the captured image only on the display device 200. However, by displaying the operation screen, the image displayed on the display device 200 can be controlled (paused or reversed 30 seconds, for example) on the digital video camera 100 side. Convenience is therefore improved for user operations, and the viewers can better enjoy watching the moving image.

2.2 Changing the Image Transmitted to the Display Device

When displaying moving image on the LCD panel 123 in the recording mode, the digital video camera 100 can receive a command to change to transferring a higher resolution image to the display device 200 from the user. The user can assert such a command by touching the touch panel 173 or operating the operation unit 150, for example. Commands to transfer a higher resolution image to the display device 200 include a command to display a still image including one frame selected from plurality of frames in the moving image, for example.

When the controller 130 of the digital video camera 100 receives such a command, it switches from transferring VGA quality moving image to transferring higher resolution HD quality moving image. To transfer higher resolution images to the display device 200, however, the controller 130 makes the frame rate lower. For example, when the image quality of the transferred moving image is changed from VGA quality to HD quality, the controller 130 lowers the frame rate from 30 fps to 1 fps.

When the frame rate of moving image content is relatively high, low image quality is not particularly noticeable to the viewer, but when the frame rate is relatively low and very close to a still image, low image quality becomes noticeable to the viewer. Therefore, when transferring VGA quality moving image to the display device 200 and the user instructs displaying a still image, the digital video camera 100 transfers HD quality moving image so that a higher resolution still image can be viewed. Operation of the digital video camera 100 and the display device 200 when a through image is displayed on the LCD panel 123 and a command to transfer a higher resolution image to the display device 200 is received from the user is described below with reference to FIG. 8 and FIG. 9A to 9C.

Figure 8:
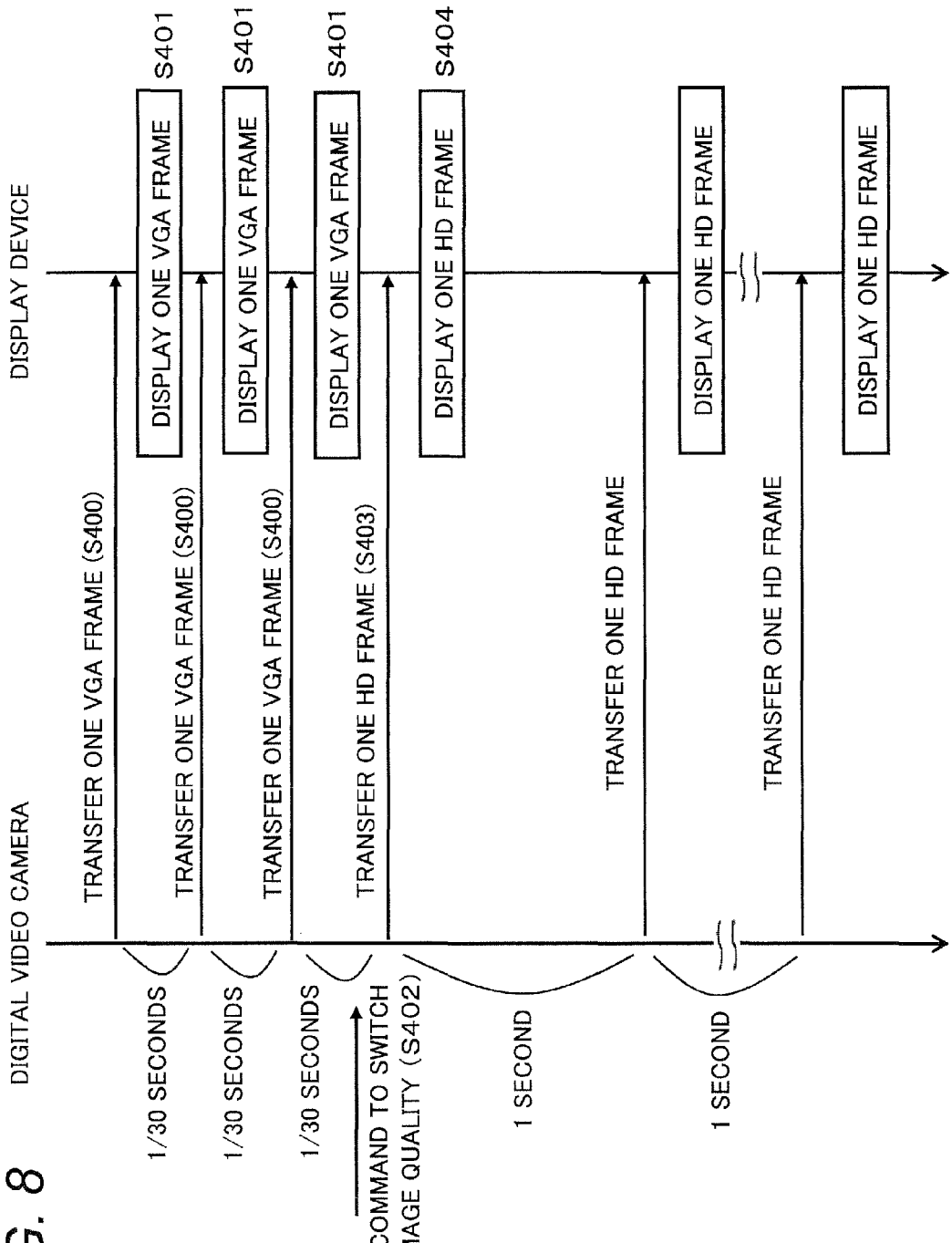
FIG. 8 describes a flow of a display operation when recording a still image is commanded during transferring moving image.

FIG. 8 is a flow chart showing the operation when a relatively low resolution image is being transferred to the display device 200 and a command to transfer a higher resolution image to the display device 200 is received from the user. FIG. 9A to 9C show changing the images displayed on the display device 200 when a command to transfer a higher resolution image to the display device 200 is received from the user.

When this operation starts, the controller 130 of the digital video camera 100 is transferring VGA quality moving image data at 30 fps to the display device 200 (S400, See FIG. 9A). When a VGA quality, 30-fps moving image is received from the digital video camera 100, the display device 200 displays the VGA quality, 30-fps moving image data on the LCD panel 215 (S401, FIG. 9A).

While transferring a VGA quality, 30-fps moving image to the display device 200, the controller 130 of the digital video camera 100 then receives a command from the user to transfer a higher resolution image (S402). When this command is received, the controller 130 instructs the image processor 122 to apply a process on the capturing image for generating a HD quality moving image at 1 fps. The controller 130 thus lowers the frame rate of the video on receiving a command to transfer a higher resolution image.

When a HD quality, 1-fps moving image is generated, the controller 130 of the digital video camera 100 transfers the generated HD quality, 1-fps moving image to the display device 200 (S403, See FIG. 9B). When the display device 200 receives a HD quality, 1-fps moving image from the digital video camera 100, the display device 200 changes the content displayed on the LCD panel 215 from the VGA quality, 30-fps moving image to the HD quality, 1-fps moving image (S404, See FIG. 9B).

The image transmitted to the display device 200 in step S401 is a different image than generated at a fixed frame rate by the CMOS image sensor 120. When a command to transfer a higher resolution image to the display device 200 is as same as a command to display a still image, the same HD quality image (still image) is transferred repeatedly to the display device 200 after step S404.

In addition, after changing to the HD quality, 1-fps moving image, the user can freely draw a picture on the displayed moving image by touching operation to touch panel 173 on the digital video camera 100 as shown in FIG. 9C. This function of the digital video camera 100 is called a "drawing function" below. The image drawn by using the drawing function is superimposed on the HD quality, 1-fps moving image and transferred to the display device 200. The display device 200 then displays the HD quality, 1-fps moving image with the superimposed picture drawn by using the drawing function on the LCD panel 215. When the drawing function is used, the image must be updated according to the status of the drawing operation by the user. As a result, the digital video camera 100 transfers a HD quality, 1-fps moving image to the LCD panel 215. When the drawing function is not used, image updating is not required, and the HD quality still image may be transferred instead of a HD quality, 1-fps moving image.

3. Conclusion

As described above, the digital video camera 100 of this embodiment is an electronic device capable of transmitting image data to an display device 200, which is either an external display device or an information processing device (for example, a personal computer) connected to the external display device. The digital video camera 100 includes: an CMOS image sensor 120 configured to generate captured data; a LCD panel 123; a communication unit 171 configured to transmit image data based on the generated captured data to the display device 200; and a controller configured to control the LCD panel 123. When transmitting first image data (VGA quality video image) resulting in a first delay on transmitting the first image data (VGA quality video image) to the display device 200, the controller causes an image (through image) which corresponds to the first image data (VGA quality video image) and is based on the captured data to be displayed on the LCD panel 123. On the other hand, when transmitting second image data resulting in a second delay (a delay larger than the first delay) larger than the first delay on transmitting the second image data to the display device 200, the controller causes an image (for example, a operation screen) other than an image corresponding to the second image data to be displayed on the LCD panel 123.

As a result, images can be displayed only on the display device 200, in a case where the digital video camera 100 and the display device 200 possibly display images with a shift in display time between the digital video camera 100 and the display device 200. All viewers, including the user of the digital video camera 100, can therefore focus on the same image displayed on the display device 200, and viewers including the user can share the same image.

When HD quality moving image which may result in a large delay longer than VGA quality moving image is transmitted to the display device 200, the digital video camera 100 controls the LCD panel 123 not to display through image and to display the operation button screen. By displaying an operation button screen, video displayed on the display device 200 can be remotely controlled (including pausing and reversing 30 seconds, etc.) by the digital video camera 100 side. The user of the digital video camera 100 can therefore control from the digital video camera 100 how video is displayed on the display device 200.

The digital video camera 100 is configured to include a CMOS image sensor 120 configured to capture a subject and generates captured data; an image processor 122 configured to generate a VGA quality, 30-fps moving image (first image having a first resolution and a first frame rate), and HD quality, 1-fps moving image (second image having a second resolution higher than the first resolution, and a second frame rate lower than the first frame rate), from the generated captured data; and a communication unit 171, wherein receiving a command from the user to transfer a higher resolution image to the display device 200, the communication unit 171 transmits VGA quality, 30-fps moving image to the display device 200 and then transmits HD quality, 1-fps moving image to the display device 200. High resolution video can therefore be viewed.

The display device 200 is configured to include an LCD panel 215; a communication unit 211 capable of receiving images from the digital video camera 100; and a controller 212, wherein when receiving a VGA quality 30 fps moving image, after the controller 212 causes a VGA quality 30 pfs moving image to be displayed on the LCD panel 215, and subsequently, when receiving a HD 1 fps moving image, the controller 212 changes the display on the LCD panel 215 from the VGA quality 30 fps moving image to the HD quality 1 fps moving image. High resolution video can therefore be viewed.

In the above configuration, it is described a case of changing the display on the LCD panel 123 of the digital video camera 100 from a VGA quality, 30-fps moving image to a HD quality, 1-fps moving image when a command to transfer a higher resolution image to the display device 200 is received from the user. However, it may be configured to change from the HD quality, 1-fps moving image to the VGA quality, 30-fps moving image when a HD quality, 1-fps moving image is displayed. This enables easily changing from viewing higher resolution moving images to viewing a different subject.

Other Embodiments

A preferred embodiment of the disclosure is described above as an example of the technology disclosed herein. However, the technology in this disclosure is not limited thereto, and can also be applied to other embodiments including desirable changes, substitutions, additions, or subtractions. Other embodiments are also possible by combining each element of the first embodiment described above. Examples of other non-exhaustive embodiments are described below.

(1) When a start video transmission command (live streaming command) is asserted on the digital video camera 100, the display device 200 may automatically start displaying a window for displaying the video.

For example, a function that starts video transmission (live streaming) is assigned to a button 153 of the digital video camera 100. When the user of the digital video camera 100 presses this button 153, the digital video camera 100 transmits a start command of starting the transmission of the moving image to the display device 200, and then transmits the video. When the display device 200 receives this start command, the display device 200 performs a popup display which displays a window screen for displaying the transferred image from the digital video camera 100. The display device 200 then displays the moving image received after the start command from the digital video camera 100 in the popup window in real time.

When the user then presses the button 153 of the digital video camera 100 again, the digital video camera 100 stops transmitting the moving image to the display device 200, and transmits a stop command of ending the transmission to the display device 200. When the digital video camera 100 receives the stop command, the display device 200 minimizes or closes the window screen for displaying the moving image transferred from the digital video camera 100.

There are several alternative examples, such as the first alternative example and the second alternative example described below, of the method for automatically opening the display screen of a moving image being transmitted from the digital video camera 100, as well as the example of popup display of the popup screen as described above.

In the first alternative example, it is assumed that the display unit 200 performs PinP (Picture in Picture) display which displays a sub-screen on a main-screen, and the moving image transmitted from the digital video camera 100 is displayed on the sub-screen. In this situation, when a user of the digital video camera 100 presses a button 153 to which a function of instruction for live-streaming is assigned, the digital video camera 100 transmits a command of changing the screen to the display device 200. When the display device 200 receives this command of changing the screen, the display device 200 changes the screen for displaying the image transmitted from the digital video camera 100 from the sub-screen to the main-screen. At the same time, the screen for displaying a moving image which has displayed on the main-screen before receiving the command is changed from the main-screen to the sub-screen. Namely, the moving image for displaying on the main-screen and the moving image for displaying on the sub-screen are changed to each other.

After that, when the user presses the button 153 of the digital video camera 100 again, the digital video camera 100 transmits a command of changing the screen to the display device 200. When the display device 200 receives the command, the display device 200 changes the screen displaying the screen for displaying the moving image transmitted from the digital video camera 100 from the main-screen to the sub-screen.

In the second alternative example, it is assumed that a video input channel of moving image to be displayed on the display device 200 is selected. The display device 200 is capable of displaying moving image provided from the selected video input channel. For example, it is assumed that the display device 200 has a first video input channel for inputting moving image from a DVD recorder connected via a HDMI connection, and a second video input channel for inputting moving image received from the digital video camera 100. It is assumed that the display device 200 displays video input from the first video input channel. In this situation, when the user of the digital video camera 100 presses the button 153 to which a function of instruction for live-streaming is assigned, the digital video camera 100 transmits a command of changing the video input channel to the display device 200. When the display device 200 receives a command of changing this video input channel, the display device 200 changes the video input channel from the first video input channel to the second video input channel. Namely, the display device 200 changes the displayed content from the moving image output from the DVD recorder to the moving image transmitted from the digital video camera 100.

After that, when the user presses the button 153 of the digital video camera 100, the digital video camera 100 transmits a command of changing the video input channel to the display device 200. When the display device 200 receives the command, the display device 200 changes the video input channel from the second video output channel to the first video input channel.

As a result, the user (such as a teacher) of the digital video camera 100 can easily operate the display device 200 to display an image at the desired timing (such as the timing when the teacher wants the students to look at an image) using a command from the digital video camera 100 at hand. In a case where the digital video camera 100 transmits image data through a personal computer or other information processing device (relay device) to the display device 200, the information processing device may include an application configured to display a window screen in which video is displayed, and the application may have the function described above.

(2) The digital video camera 100 may also have an inversion mode for inverting the captured image vertically (rotating the image 180 degrees) then transferring the resulting image. In this inversion mode, an image captured by the CMOS image sensor 120 and inverted the top and bottom of the image is transmitted to the display device 200. In the inversion mode the image displayed on the LCD panel 123 of the digital video camera 100 is displayed directly as imaged.

Figure 10A:
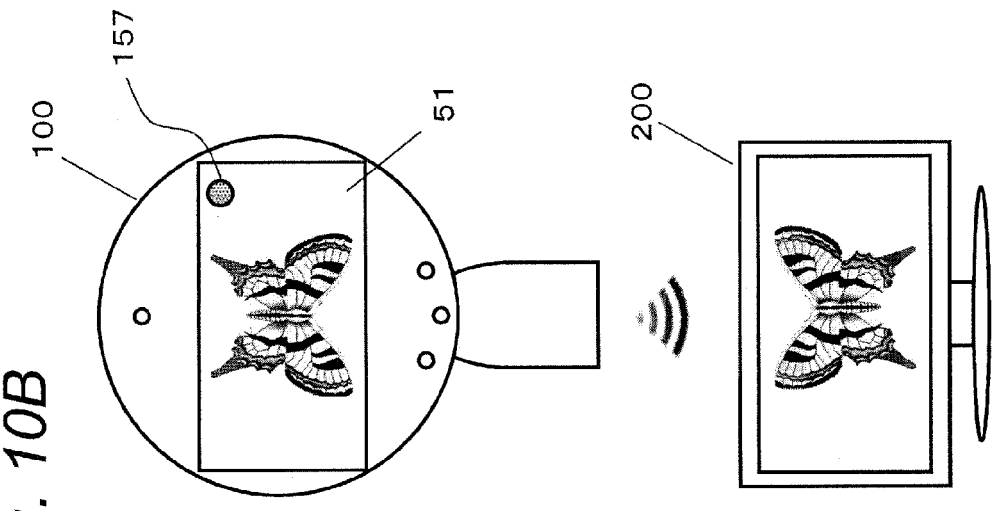
FIGS. 10A and 10B describes the process for vertically inverting the image displayed on the digital video camera.
Figure 10B:
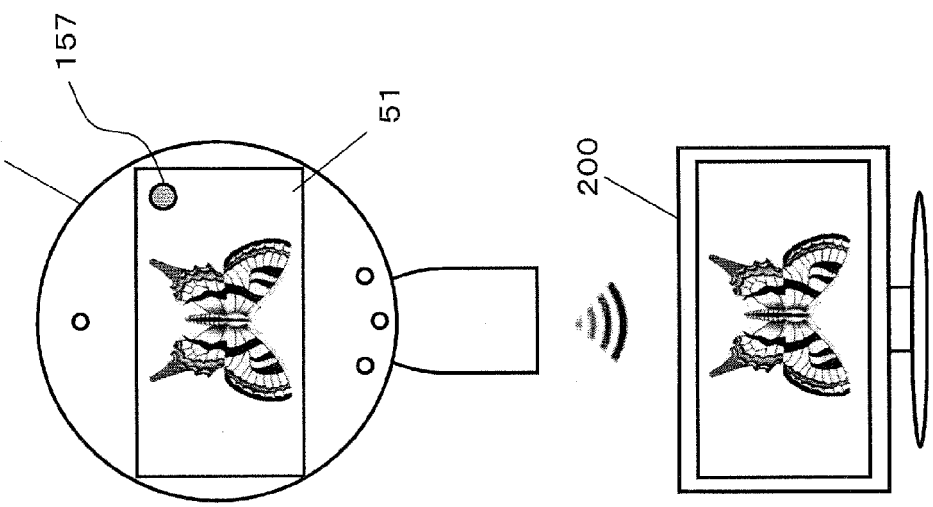

For example, a function that switches to the inversion mode may be assigned to the button 157 displayed on the LCD panel 123 as shown in FIG. 10A. The image captured by the CMOS image sensor 120 is normally transferred from the digital video camera 100 to the display device 200 and displayed on the display device 200 as shown in FIG. 10A. When the button 157 is then pressed in this status, the controller 130 executes a process of inverting the top and bottom of the image which is captured by the CMOS image sensor 120 and processed by the image processor 122. The controller 130 then transmits the inverted image through the communication unit 171 to the display device 200. As a result, the image captured by the CMOS image sensor 120 and vertically inverted the top and bottom of the image is displayed on the display device 200 as shown in FIG. 10B. When the button 157 is then pressed again, the inversion mode is cancelled and the image is again displayed as shown in FIG. 10A.

This inversion mode enables the teacher (user of the digital video camera 100) for example to stream materials (such as a memo, note, or text) used by a student sitting facing the teacher so that the image can be seen from the point of view of the student. In the inversion mode the through image displayed on the LCD panel 123 of the digital video camera 100 is not inverted and is displayed as captured. When the user of the digital video camera 100 changes the captured area while viewing the subject through the LCD panel 123, the user can easily operate the digital video camera 100 without moving mistakenly in the wrong direction up, down, left or right.

Figure 11:
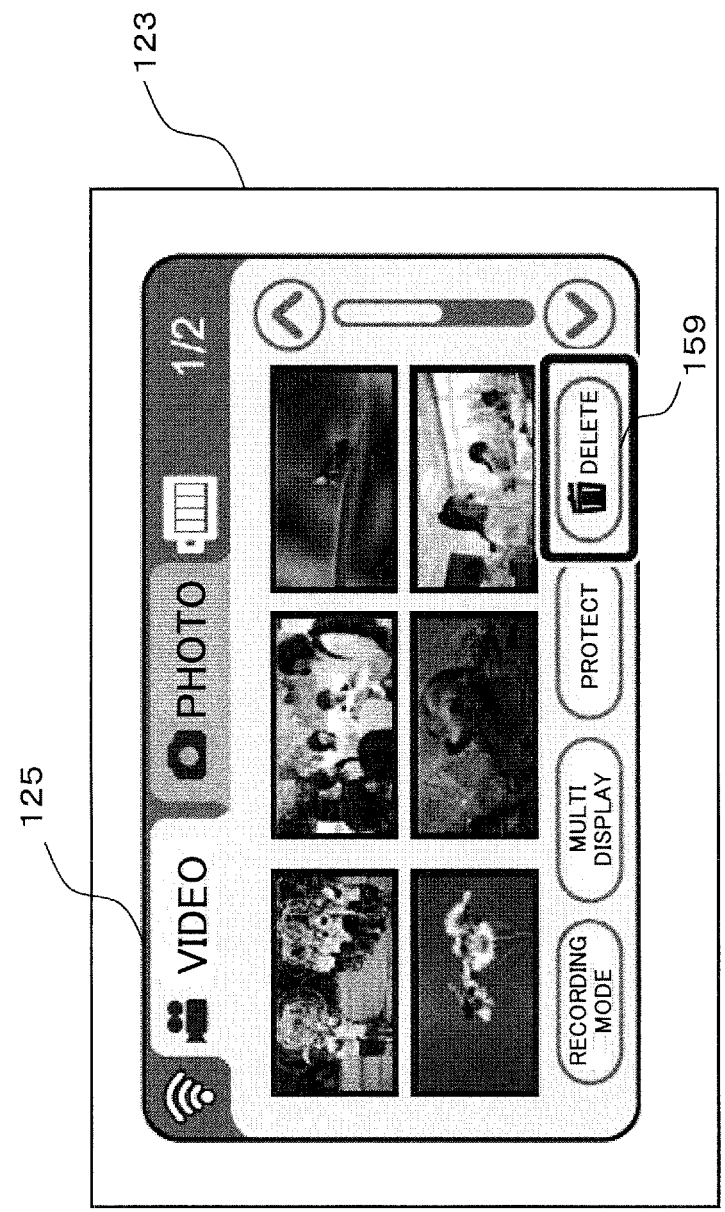
FIG. 11 describes a delete button displayed on the digital video camera.

(3) The digital video camera 100 may also include a delete button for deleting image data stored on the memory card 140, and may additionally have a function that tunes the displaying of the delete button on/off. FIG. 11 shows an image listing screen that is displayed when deleting images stored in the memory card 140. In the image listing screen 125, a plurality of thumbnail images corresponding to the images stored in the memory card 140 are displayed. In the image listing screen 125, a plurality operation buttons including a delete button 159 are displayed together with the thumbnail images. When the user selects a thumbnail image on the image listing screen 125 and presses the delete button 159, the image corresponding to the selected thumbnail image is deleted.

Figure 12:
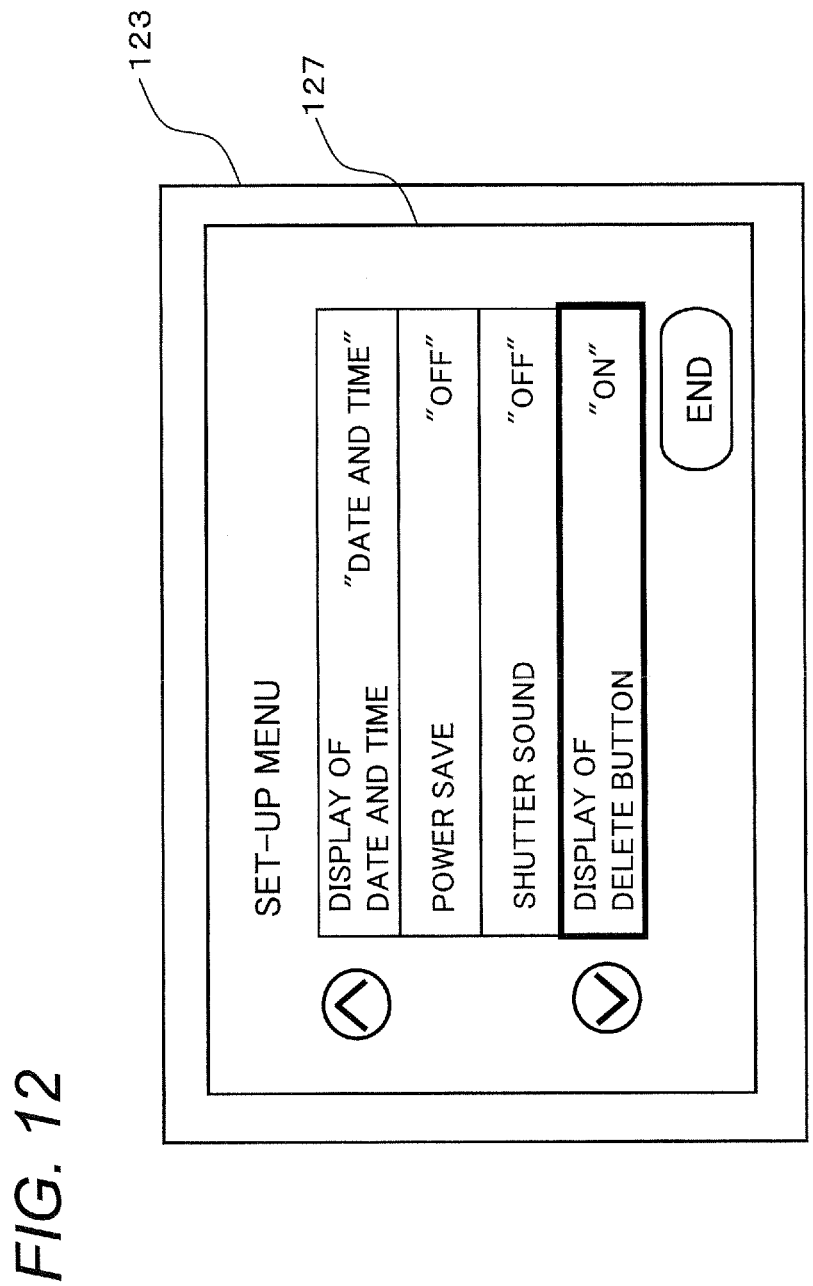
FIG. 12 describes a set-up menu displayed on the digital video camera.

FIG. 12 shows a set-up menu for turning displaying the delete button 159 on/off. The set-up menu 127 is a menu for configuring various functions of the digital video camera 100, including displaying the date and time, and a power saving mode, etc. Displaying the delete button 159 can be turned on or off from this set-up menu 127. By turning displaying the delete button 159 off, students can be prevented from accidentally or maliciously deleting an image, for example. The image listing screen 125 and the set-up menu 127 are displayed by performing a predetermined operation on the digital video camera 100.

The foregoing embodiments are described as examples of the technology of the disclosure disclosed herein, and the accompanying figures and detailed description are provided for this purpose.

The elements described in the accompanying figures and detailed description therefore include, in addition to elements that are necessary to solve the problem described above, elements that are not necessary to solve the foregoing problem but are useful for describing the technology. Therefore, elements that are not essential are described in the accompanying figures and detailed description should therefore not be construed to mean that non-essential elements are essential.

The foregoing embodiments are for describing the technology disclosed by the disclosure, and changes, substitutions, additions, and subtractions within the scope of the accompanying claims and the equivalent are possible.

Note;

The technical concept regarding electronic devices as described below is also disclosed in the foregoing embodiments.

(A-1) An electronic device capable of transmitting a capturing images or image data related to an image reproduced from a recording medium to an external display device or an information processing device connected to the external display device, the electronic device including:

an operation unit configured to receive an instruction related to a transmission of image data from a user;

a communication unit configured to transmit image data to the external display device or the information processing device; and a controller configured to control the communication unit, wherein when the operation unit receives a first operation from the user, the controller controls the communication unit to start transmitting image data and causes the external display device to display a display screen for displaying the image data received from the electronic device, and then when receiving a second operation via the operation unit from the user, the controller controls the communication unit to stop transmitting the image data to the external display device or the information processing device and minimizes or stops displaying the display screen.

(A-2) An electronic device capable of transmitting image data related to a capturing image or an image reproduced from a recording medium to an external display device or an information processing device connected to the external display device, the electronic device including:

an operation unit configured to receive an instruction from an user configured to transmit the image data;

a communication unit configured to transmit image data to the external display device or the information processing unit; and a controller configured to control the communication unit, wherein when receiving a first operation via the operation unit from the user, the controller changes a screen for displaying the image data received from the electronic device from a first screen to a second screen.

(A-3) An electronic device capable of transmitting image data related to a capturing image or an image reproduced from a recording medium to an external display device or an information processing device connected to the external display device, the electronic device including:

an operation unit configured to receive an instruction related to a transmission of image data from a user;

a communication unit configured to transmit image data to the external display device or the information processing unit; and a controller configured to control the communication unit, wherein when receiving a first operation via the operation unit from the user, the controller changes a video output channel from a first channel for displaying the image data received from other device to a second channel for displaying the image data received from the electronic device.

(B) An electronic device capable of transmitting image data to an external display device or an information processing device connected to the external display device, the electronic device including:

an image capturing unit configured to capture a subject and generating image data;

an operation unit configured to receive an inversion command for vertically inverting an image from an user;

a communication unit configured to transmit image data to the external display device or the information processing device; and a controller configured to control the communication unit, wherein when receiving an instruction for the inversion command via the operation unit from the user, the controller generates image data indicating an image vertically inverted the top and the bottom of the image captured by the image capturing unit and transmits the generated image data to the external display device or the information processing device through the communication unit.

The electronic device may further include a display unit. In this case, the controller may cause the display unit to display the image captured by the image capturing unit without inverting the top and the bottom of the image as captured, when transmitting image data including an image vertically inverted the top and the bottom of the image captured by the image capturing unit, to the external display device.

(C) An electronic device capable of transmitting image data to an external display device or an information processing device connected to an external display device, the electronic device including:

an image capturing unit configured to capture a subject and generating image data;

a recording unit configured to record the image data in a recording medium;

a display unit configured to display a delete button configured to receive an instruction for deleting image data recorded in the recording medium from a user; and a controller configured to control the display unit, wherein the controller causes the display unit to display a configuration screen for setting whether or not to display the delete button on the display unit.

APPLICATION IN INDUSTRY

The present disclosure is not limited to application in a digital video camera or display device. More specifically, the concept of the disclosure can be applied in video cameras, smartphones, and other communication devices having a communication unit.

The invention claimed is:

1. An electronic device capable of transmitting image data to an external device for display, the electronic device comprising:
   an image capturing unit configured to generate captured data;
   a display unit;
   a communication unit configured to transmit image data based on the generated captured data to the external device; and
   a controller configured to control the display unit, wherein:
   when transmitting first image data resulting in a first delay on transmitting the first image data to the external device, the controller causes an image which corresponds to the first image data and is based on the captured data to be displayed on the display unit, and
   when transmitting second image data resulting in a second delay larger than the first delay on transmitting the second image data to the external device, the controller causes an image other than an image corresponding to the second image data to be displayed on the display unit to avoid a display timing difference between the display unit and the external device.

2. The electronic device according to claim 1, wherein when the external device receives an image from the electronic device, the external device causes the received image to be displayed on an external display device.

3. The electronic device according to claim 1, wherein the image other than the second image is an image including an operation button for remotely operating the external device.

4. The electronic device according to claim 1, wherein the first image is an image having a first resolution, and the second image is an image having a resolution higher than the first resolution.

5. The electronic device according to claim 1, wherein the second image is an image that is read from a predetermined recording medium and then reproduced.

6. An electronic device capable of transmitting image data to an external device for display, the electronic device comprising:
   an image capturing unit configured to generate captured data;
   a display unit;
   a communication unit configured to transmit image data based on the generated captured data to the external device; and
   a controller configured to control the display unit, wherein:
   the controller has a recording mode for recording image data based on the captured data generated by the image capturing unit, and a playback mode for reproducing image data recorded in a predetermined recording medium,
   in the recording mode, the controller transmits an image based on the captured data which is generated by the image capturing unit to the external device through the communication unit, and causes the image based on the captured data generated by the image capturing unit to be displayed on the display unit, and
   in the playback mode, the controller transmits the image data recorded in the predetermined recording medium to the external device through the communication unit, and causes no image based on the image data recorded in the predetermined recording medium to be displayed on the display unit to avoid a display timing difference between the display unit and the external device.

7. The electronic device according to claim 2, wherein the external display device includes at least one of (i) a part of the external device, and (ii) a device releasably connectable to the external device.

8. The electronic device according to claim 6, wherein the image transmitted in the recording mode has a first resolution, and the image transmitted in the playback mode has a second resolution which is higher than the first resolution.

* * * * *